US008548276B2

(12) United States Patent  (10) Patent No.: US 8,548,276 B2
Honma et al.  (45) Date of Patent: Oct. 1, 2013

(54) IMAGE SEARCH APPARATUS, IMAGE SCANNING APPARATUS, IMAGE SEARCH SYSTEM, DATABASE CREATION METHOD, AND DATABASE CREATION PROGRAM

(75) Inventors: Toshiki Honma, Amagasaki (JP); Masato Fujii, Nagaokakyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 13/230,526

(22) Filed: Sep. 12, 2011

(65) Prior Publication Data

US 2012/0063688 A1 Mar. 15, 2012

(30) Foreign Application Priority Data

Sep. 13, 2010 (JP) .................................. 2010-204433

(51) Int. Cl.
*G06K 9/54* (2006.01)
*G06K 9/60* (2006.01)
*G06K 9/68* (2006.01)

(52) U.S. Cl.
USPC ............................ 382/305; 382/306; 382/218

(58) Field of Classification Search
USPC ......................................... 382/305, 306, 218
See application file for complete search history.

(56) References Cited

U.S. PATENT DOCUMENTS

| | | | | | |
|---|---|---|---|---|---|
| 5,745,907 | A | * | 4/1998 | Yamamoto | 715/223 |
| 5,907,835 | A | * | 5/1999 | Yokomizo et al. | 1/1 |
| 6,700,998 | B1 | * | 3/2004 | Murata | 382/117 |
| 7,233,945 | B2 | * | 6/2007 | Shiiyama | 1/1 |
| 7,515,754 | B2 | * | 4/2009 | Hung | 382/218 |
| 7,647,303 | B2 | * | 1/2010 | Kudo | 707/999.003 |
| 7,797,324 | B2 | * | 9/2010 | Miyoshi | 707/741 |
| 7,856,144 | B2 | | 12/2010 | Matsushita | |
| 7,925,076 | B2 | * | 4/2011 | Abe et al. | 382/151 |
| 8,417,128 | B2 | * | 4/2013 | Naito | 399/8 |
| 2006/0268352 | A1 | * | 11/2006 | Tanigawa et al. | 358/403 |
| 2009/0245597 | A1 | * | 10/2009 | Toyama | 382/125 |
| 2010/0076867 | A1 | | 3/2010 | Inoue et al. | |
| 2010/0205142 | A1 | * | 8/2010 | Feulner et al. | 707/602 |

FOREIGN PATENT DOCUMENTS

| | | | |
|---|---|---|---|
| JP | 06-090316 | | 3/1994 |
| JP | 2001-319231 | | 11/2001 |
| JP | 2002-024799 | | 1/2002 |
| JP | 2006-293712 | | 10/2006 |
| JP | 2007-12024 | | 1/2007 |
| JP | 2011070540 A | * | 4/2011 |
| WO | WO 2010-016281 | | 2/2010 |

OTHER PUBLICATIONS

Japanese Notice of Allowance mailed Jul. 24, 2012, directed to Japanese Application No. 204433/2010 w/English translation and certification of translation, 7 pgs.

* cited by examiner

*Primary Examiner* — Utpal Shah
(74) *Attorney, Agent, or Firm* — Morrison & Foerster LLP

(57) ABSTRACT

An image search apparatus capable of communicating with an image scanning apparatus includes: a common area extraction portion to compare a plurality of registration images stored in the storage portion and to extract a common area including an identical or similar image among a plurality of registration images; a search area determination portion to determine a non-common area excluding the common area, as a search area; a transmission request portion to request transmission of a document image if, as a result of comparison by the comparison portion, a registration image in which the reference image is identical or similar to the partial image does not exist in the plurality of registration images; and a registration portion to, in response to a request by the transmission request portion, store a document image received from the image scanning apparatus as a registration image into the storage portion.

12 Claims, 8 Drawing Sheets

F I G. 7
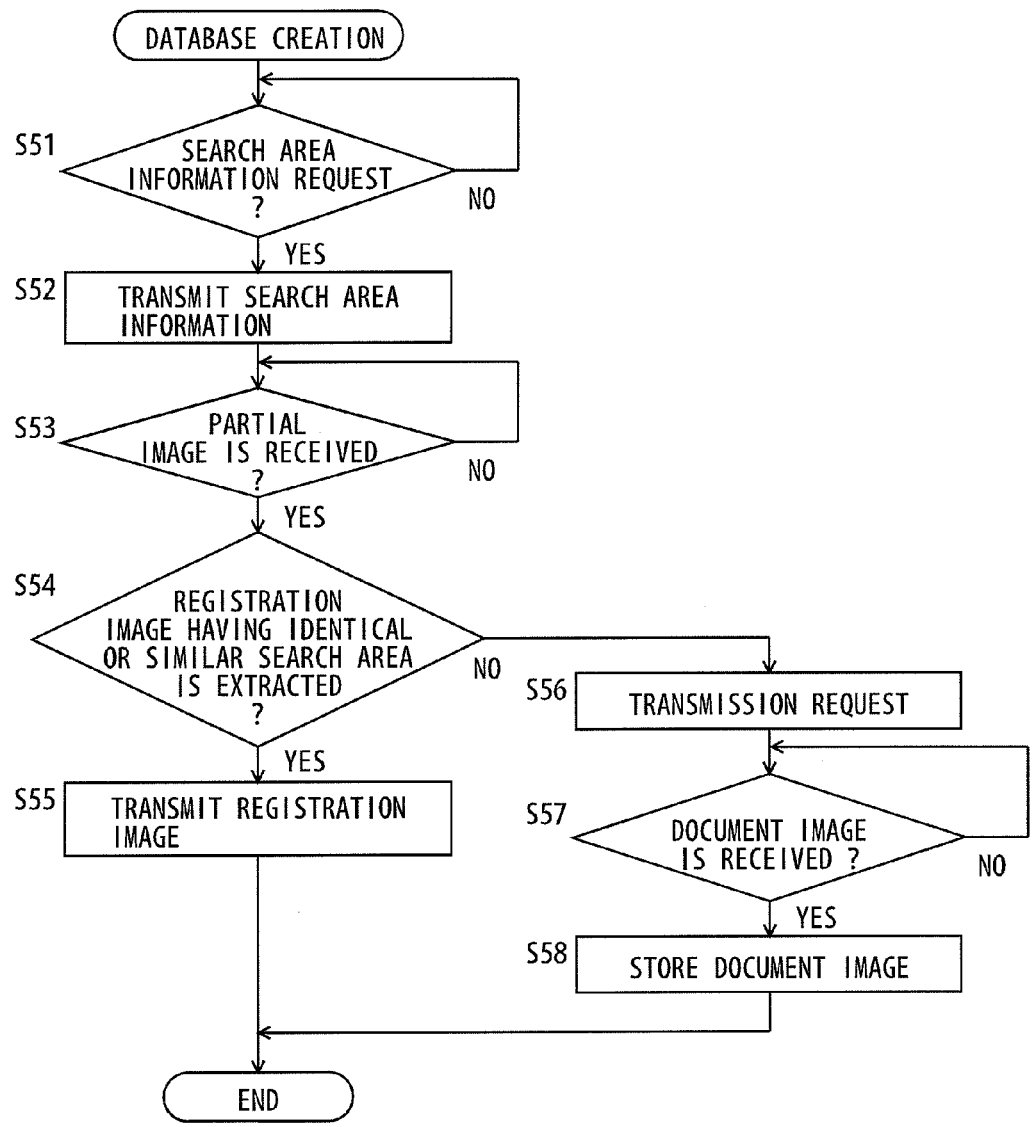

IMAGE SEARCH APPARATUS, IMAGE SCANNING APPARATUS, IMAGE SEARCH SYSTEM, DATABASE CREATION METHOD, AND DATABASE CREATION PROGRAM

This application is based on Japanese Patent Application No. 2010-204433 filed with Japan Patent Office on Sep. 13, 2010, the entire content of which is hereby incorporated by reference.

BACKGROUND OF THE INVENTION

1. Field of the Invention

The present invention relates to an image search apparatus, an image scanning apparatus, an image search system, a database creation method, and a non-transitory computer-readable recording medium encoded with a database creation program. More specifically, the present invention relates to an image search apparatus and an image scanning apparatus for creating a database which stores images scanned by the image scanning apparatus, an image search system including these apparatuses, a database creation method executed in the image search apparatus, and a non-transitory computer-readable recording medium encoded with a database creation program.

2. Description of the Related Art

In recent years, the storage capacity of servers has been increasing, enabling user to store more images. When many images are stored, they have to be databased. Information is then required to search images. Japanese Patent Laid-Open No. 2007-12024 discloses an image search apparatus which determines similarities based on the features of images and searches images. However, when images are compared entirely, the areas to be compared are so large that the load on search processing is heavy.

On the other hand, with the progress of network techniques, it is expected that a system is constructed such that an image search apparatus having a database and an image scanning apparatus receiving input of images to be searched are connected with each other via a network. In this case, the image input to the image scanning apparatus has to be transmitted to the image search apparatus over the network. However, the data amount of images is relatively large, thereby increasing the communication load in transmitting images.

SUMMARY OF THE INVENTION

In accordance with an aspect of the present invention, an image search apparatus capable of communicating with an image scanning apparatus includes: a storage portion capable of storing a plurality of registration images; a common area extraction portion to compare a plurality of registration images stored in the storage portion and to extract a common area including an identical or similar image among a plurality of registration images; a search area determination portion to determine a non-common area excluding the common area, as a search area; a search area information transmission portion to transmit search area information indicating a location of the search area in an image to the image scanning apparatus; a comparison portion to compare a partial image received from the image scanning apparatus with a reference image corresponding to the search area of each of a plurality of registration images stored in the storage portion; a transmission request portion to request transmission of a document image if, as a result of comparison by the comparison portion, a registration image in which the reference image is identical or similar to the partial image does not exist in the plurality of registration images; and a registration portion to, in response to a request by the transmission request portion, store a document image received from the image scanning apparatus as a registration image into the storage portion.

In accordance with another aspect of the present invention, an image scanning apparatus includes: a document scanning portion to output a document image obtained by scanning a document; a partial image transmission portion to transmit a partial image obtained by cutting out a search area part defined by search area information received from an image search apparatus, from the output document image; and a document image transmission portion to transmit the document image to the image search apparatus if a transmission request is received from the image search apparatus in response to transmission of the partial image.

In accordance with a further aspect of the present invention, an image search system includes an image search apparatus and an image scanning apparatus. The image search apparatus includes: a storage portion capable of storing a plurality of registration images; a common area extraction portion to compare a plurality of registration images stored in the storage portion and to extract a common area including an identical or similar image among a plurality of registration images; a search area determination portion to determine a non-common area excluding the common area, as a search area; a search area information transmission portion to transmit search area information indicating a location of the search area in an image to the image scanning apparatus; a comparison portion to compare a partial image received from the image scanning apparatus with a reference image corresponding to the search area of each of a plurality of registration images stored in the storage portion; a transmission request portion to request transmission of a document image if, as a result of comparison by the comparison portion, a registration image in which the reference image is identical or similar to the partial image does not exist in the plurality of registration images; and a registration portion to, in response to a request by the transmission request portion, store a document image received from the image scanning apparatus as a registration image into the storage portion. The image scanning apparatus includes: a document scanning portion to output a document image obtained by scanning a document; a partial image transmission portion to transmit a partial image obtained by cutting out a search area part defined by search area information received from the image search apparatus, from the output document image; and a document image transmission portion to transmit the document image to the image search apparatus if a transmission request is received from the image search apparatus in response to transmission of the partial image.

In accordance with a still further aspect of the present invention, a database creation method is executed in an image search apparatus capable of communicating with an image scanning apparatus. The image search apparatus includes a storage portion capable of storing a plurality of registration images. The database creation method includes the steps of: comparing a plurality of registration images stored in the storage portion and extracting a common area including an identical or similar image among a plurality of registration images; determining a non-common area excluding the common area, as a search area; transmitting search area information indicating a location of the search area in an image to the image scanning apparatus in response to a request from the image scanning apparatus; comparing a partial image received from the image scanning apparatus with a reference image corresponding to the search area of each of a plurality of registration images stored in the storage portion; requesting transmission of a document image from the image scanning apparatus if, as a result of comparison in the step of comparing, a registration image in which the reference image is identical or similar to the partial image does not exist in the plurality of registration images; and storing a document image received from the image scanning apparatus as a registration image into the storage portion in response to a request in the step of requesting transmission.

In accordance with yet another aspect of the present invention, a non-transitory computer-readable recording medium is encoded with a database creation program performed by a computer. The computer is configured to control an image search apparatus capable of communicating with an image scanning apparatus. The image search apparatus includes a storage portion capable of storing a plurality of registration images. The database creation program causes the computer to execute processing including the steps of; comparing a plurality of registration images stored in the storage portion and extracting a common area including an identical or similar image among a plurality of registration images; determining a non-common area excluding the common area, as a search area; transmitting search area information indicating a location of the search area in an image to the image scanning apparatus in response to a request from the image scanning apparatus; comparing a partial image received from the image scanning apparatus with a reference image corresponding to the search area of each of a plurality of registration images stored in the storage portion; requesting transmission of a document image from the image scanning apparatus if, as a result of comparison in the step of comparing, a registration image in which the reference image is identical or similar to the partial image does not exist in the plurality of registration images; and storing a document image received from the image scanning apparatus as a registration image into the storage portion in response to a request in the step of requesting transmission.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 7 is a flowchart showing an exemplary flow of a database creation process.

DESCRIPTION OF THE PREFERRED EMBODIMENTS

Figure 1:
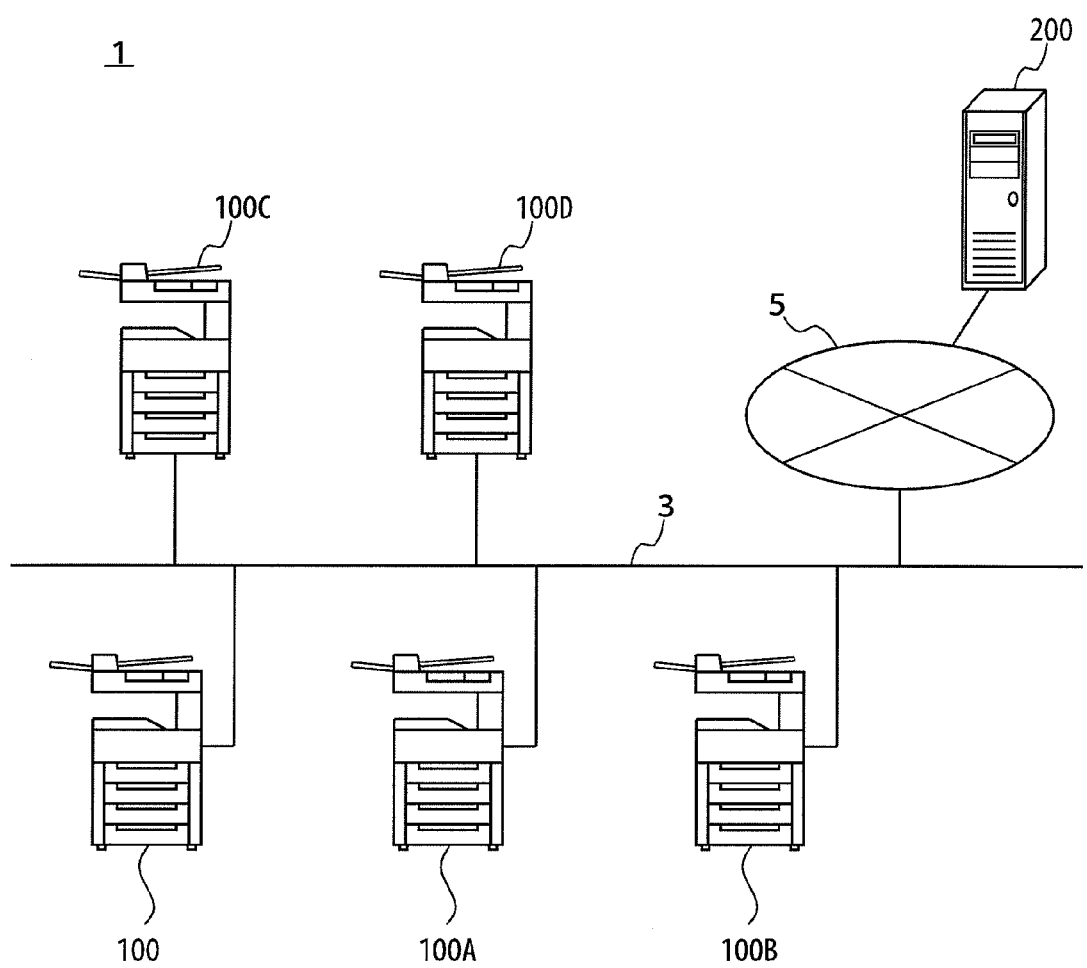
FIG. 1 is a diagram showing an overview of an image search system in an embodiment of the present invention.

The preferred embodiments of the present invention will be described below in conjunction with the drawings. In the following description, the same or corresponding parts are denoted by the same reference characters. Their names and functions are also the same. Thus, a detailed description thereof will not be repeated.

FIG. 1 is a diagram showing an overview of an image search system in an embodiment of the present invention. Referring to FIG. 1, an image search system 1 includes Multi Function Peripherals (hereinafter referred to as "MFP") 100, 100A-100D each connected to a network 3, and a search server 200 connected to the Internet 5.

MFPs 100, 100A-100D are an example of the image scanning apparatus and includes multiple functions such as a scanner function, a printer function, a copy function, and a facsimile function.

Network 3 is a Local Area Network (LAN), either wired or wireless. MFPs 100, 100A-100D can communicate with each other via network 3 and can communicate with search server 200 via network 3 and the Internet 5. Network 3 is not limited to a LAN and may be the Internet, a Wide Area Network (WAN), or a Public Switched Telephone Network.

Search server 200 is a general computer and is an example of the image search apparatus. In the present embodiment, search server 200 stores a plurality of images as a database, registers images transmitted from MFPs 100, 100A-100D into the database, and searches the database based on images transmitted from MFP 100, 100A-100D.

MFPs 100, 100A-100D each have the same functions. Therefore, here, the functions of MFP 100 will be taken as an example.

Figure 2:
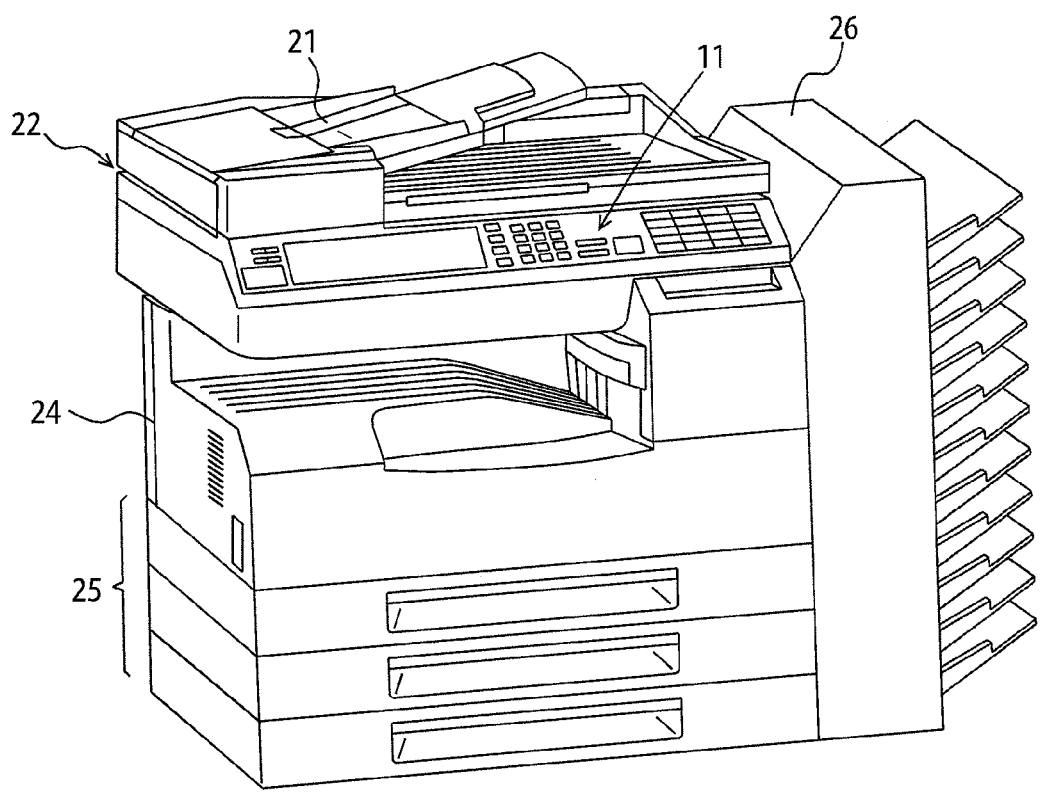
FIG. 2 is an external perspective view of an MFP.
Figure 3:
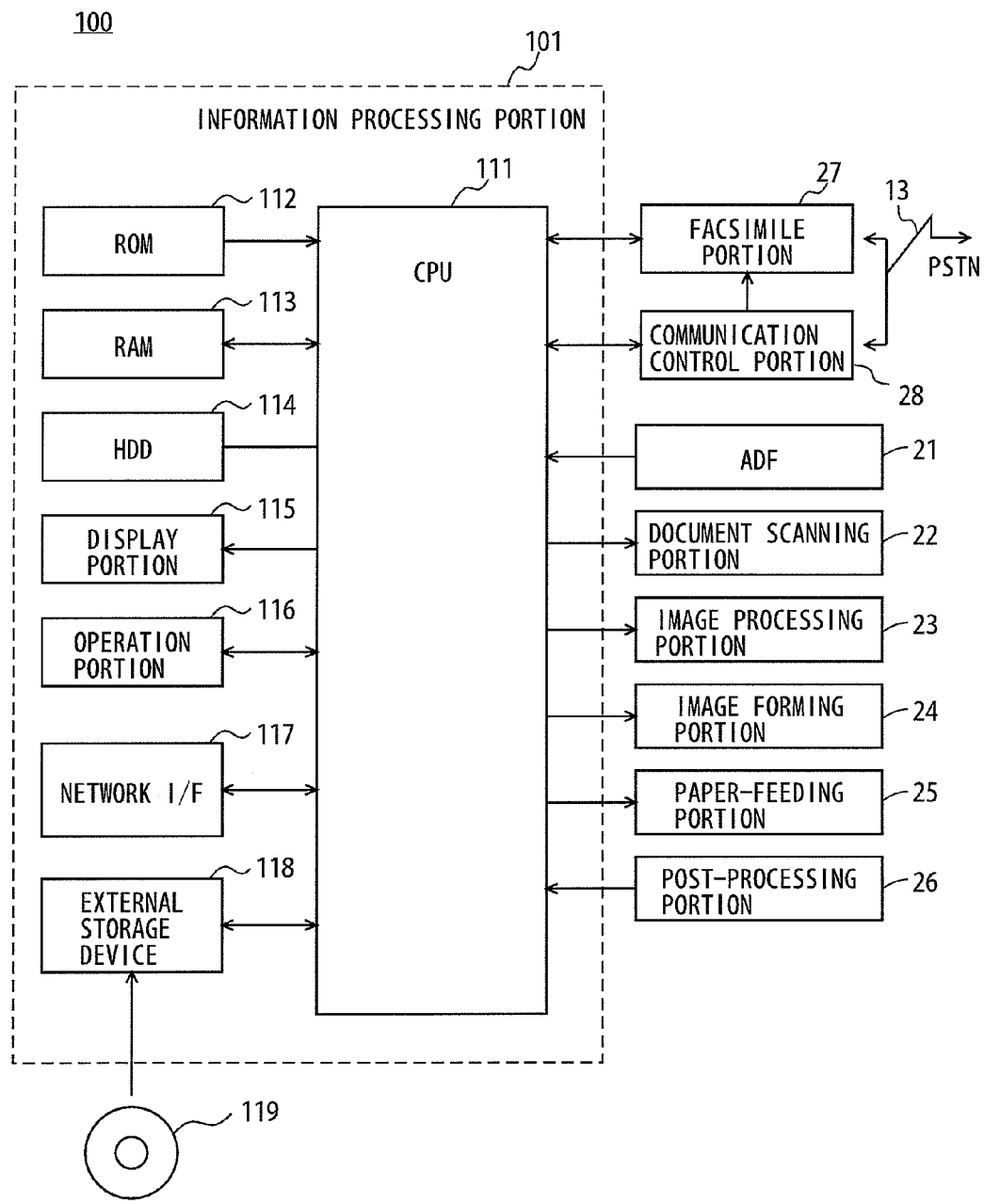
FIG. 3 is a block diagram showing an exemplary hardware configuration of the MFP.

FIG. 2 is an external perspective view of an MFP. FIG. 3 is a block diagram showing an exemplary hardware configuration of the MFP. Referring to FIG. 2 and FIG. 3, MFP 100 includes an information processing portion 101, a facsimile portion 27, a communication control portion 28, an automatic document feeder (ADF) 21, a document scanning portion 22, an image processing portion 23, an image forming portion 24, a paper-feeding portion 25, and a post-processing portion 26. MFP 100 includes an operation panel 11 as a user interface on the top surface thereof.

Information processing portion 101 includes a Central Processing Unit (CPU) 111, a ROM (Read Only Memory) 112 storing, for example a program to be executed by CPU 111, a RAM (Random Access Memory) 113 to be used as a work area of CPU 111, a hard disk drive (HDD) 114 for storing data in a nonvolatile manner, a display portion 115, an operation portion 116, a network interface (I/F) 117, and an external storage device 118. CPU 111 is connected to ROM 112, RAM 113, HDD 114, display portion 115, operation portion 116, network I/F 117, and external storage device 118 to control the entire information processing portion 101. CPU 111 is also connected to facsimile portion 27, communication control portion 28, ADF 21, document scanning portion 22, image processing portion 23, image forming portion 24, paper-feeding portion 25, and post-processing portion 26 to control the entire MFP 100.

ADF 21 conveys multiple sheets of a document placed on a platen to document scanning portion 22, sheet by sheet. When one side of a document is to be scanned by document scanning portion 22, ADF 21 conveys the document to document scanning portion 22 to allow document scanning portion 22 to scan the front surface. When both sides of a document are to be scanned by document scanning portion 22, ADF 21 conveys the document to document scanning portion 22 to allow document scanning portion 22 to scan the front surface, and thereafter reverses the document and conveys the reversed document to document scanning portion 22 to allow document scanning portion 22 to scan the back surface.

Document scanning portion 22 optically reads image information such as photos, characters, or pictures from a document and outputs the obtained image data to image processing portion 23.

Image processing portion 23 is controlled by CPU 111 and performs image processing on image data based on an instruction from CPU 111. Image data includes image data output by document scanning portion 22 scanning a document, image data included in a print job received from another computer by network I/F 117, image data received from any other MFP 100A-100D by network I/F 117, and image data stored in HDD 114. The image processing includes, for example, an enlargement process of enlarging an image, a reduction process of reducing an image, a combination process of combining a plurality of images to produce one image, and a rotation process of rotating an image to change an orientation. Image processing portion 23 outputs the processed image data to image forming portion 24.

Paper-feeding portion 25 has a plurality of paper-feed trays and supplies paper stored in the designated paper-feed tray to image forming portion 24, sheet by sheet. Each of a plurality of paper-feed trays accommodates paper of a size selected from a plurality of sizes in a direction selected from a plurality of directions. Here, paper-feeding portion 25 has first to fourth paper-feed trays. The first paper-feed tray accommodates A4 size paper in portrait orientation. The second paper-feed tray accommodates A4 size paper in landscape orientation. The third paper-feed tray accommodates A3 size paper in portrait orientation. The fourth paper-feed tray accommodates B5 size paper in landscape orientation. When duplex print is designated, paper-feeding portion 25 turns over paper conveyed to image forming apparatus 24 and conveys the reversed paper again to image forming portion 24 in order to form images on both sides of paper.

Image forming portion 24 forms an image on paper conveyed from paper-feeding portion 25, based on image data input from image processing portion 23.

Post-processing portion 26 discharges paper having an image formed thereon. Post-processing portion 26 has a plurality of paper-exit trays and includes a sorting portion, a punched hole processing portion, and a staple processing portion. The sorting portion sorts multiple sheets of paper having images formed thereon and outputs the sorted sheets to a plurality of paper-exit trays. The punched hole processing portion punches a hole in paper. The staple processing portion staples together multiple sheets of paper having images formed thereon.

Display portion 115 is a display such as a liquid crystal display (LCD) or an organic ELD (Electro Luminescence Display) and displays, for example, instruction menus for users and information concerning the obtained image data. Operation portion 116 includes a plurality of keys and accepts input of a variety of instructions and data such as characters and numerals through user's operations corresponding to the keys. Operation portion 116 further includes a touch panel provided on display portion 115. Display portion 115 and operation portion 116 constitute operation panel 11.

Network I/F 117 is an interface for communicating using a communication protocol such as TCP (Transmission Control Protocol) or UDP (User Datagram Protocol) and communicates with search server 200 via network 3 or the Internet 5. Network I/F 117 also communicates with other MFPs 100A-100D connected to network 3.

A CD-ROM (Compact Disk Read Only Memory) 119 is attached to external storage device 118. CPU 111 can access CD-ROM 119 through external storage device 118 and can load a program stored in CD-ROM 119 into RAM 113 for execution. The program executed by CPU 111 is not limited to a program stored in CD-ROM 119 and may be a program stored in any other recording medium, a program stored in HDD 116, or a program written into HDD 114 by another computer connected to network 3 through network I/F 117.

A recording medium for storing a program is not limited to CD-ROM 119 and may be an optical disk (MO (Magnetic Optical Disc)/MD (Mini Disc)/DVD (Digital Versatile Disc)), an IC card, an optical card, or a semiconductor memory such as a mask ROM, EPROM (Erasable Programmable ROM), or EEPROM (Electrically Erasable and Programmable ROM).

Facsimile portion 27 is connected to PSTN 13 and transmits facsimile data to PSTN 13 or receives facsimile data from PSTN 13. Facsimile portion 27 converts the received facsimile data into print data printable by image forming portion 24 and outputs the print data to image forming portion 24. Thus, image forming portion 24 prints the facsimile data received by facsimile portion 27 on paper. Facsimile portion 27 converts data stored in HDD 114 into facsimile data and transmits the facsimile data to a facsimile machine connected to PSTN 13.

Figure 4:
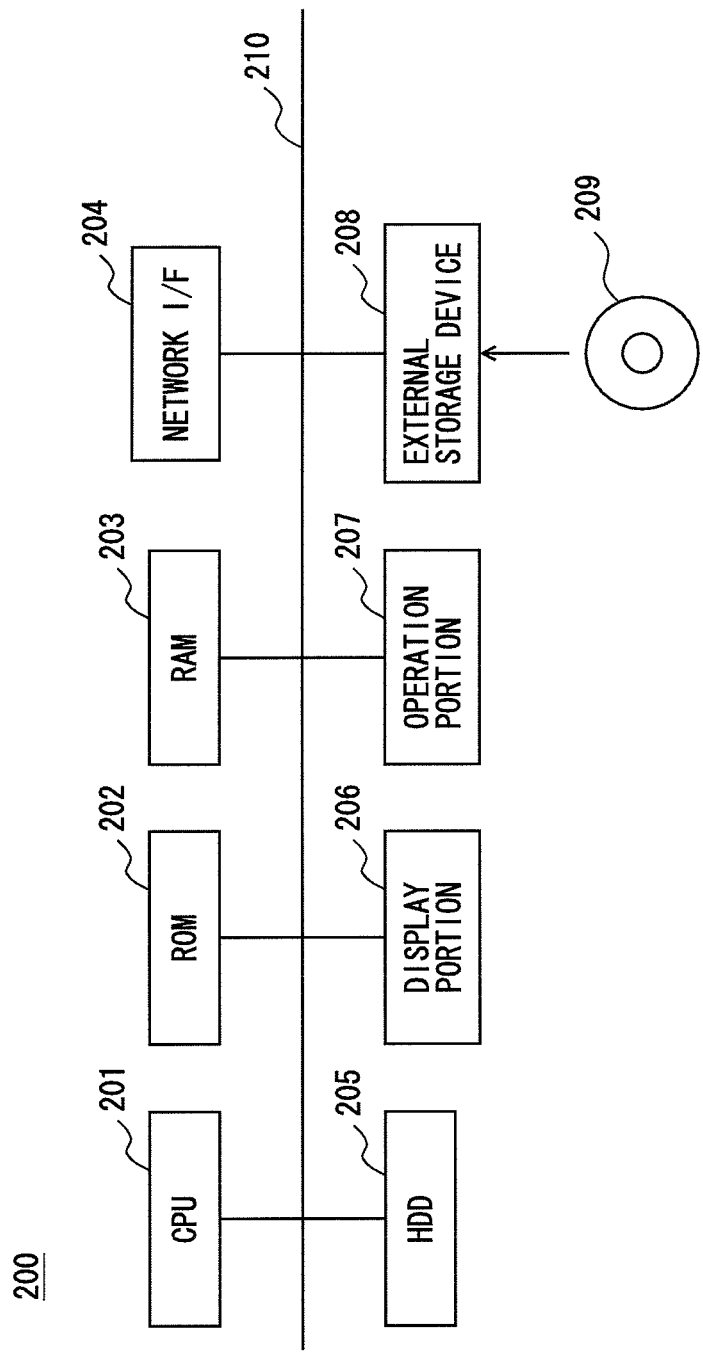
FIG. 4 is a block diagram showing an exemplary hardware configuration of a search server.

FIG. 4 is a block diagram showing an exemplary hardware configuration of the search server. Referring to FIG. 4, search server 200 includes a CPU 201 for controlling the entire search server 200, a ROM 202 for storing, for example, a program to be executed by CPU 201, a RAM 203 to be used as a work area of CPU 201, a network I/F 204 for connecting search server 200 to a network, an HDD 205 as a mass storage device, a display portion 206, an operation portion 207 accepting input of user's operations, and an external storage device 208 to which a CD-ROM 209 is attached.

HDD 205 stores a plurality of images. CPU 201 forms a database for managing a plurality of images stored in HDD 205. In the present embodiment, the database formed by CPU 201 classifies a plurality of images according to types. The types of images classified by the database are the types of documents that are sources of the images. The types of documents are, for example, the names of magazines, if applicable, meeting materials, the minutes of meetings, and reports.

CD-ROM 209 is attached to external storage device 208. An application search program executable by CPU 201 is stored in CD-ROM 209. CPU 201 controls external storage device 208 to read out the application search program from CD-ROM 209 and loads the read application search program into RAM 203 for execution.

The recording medium for storing the application search program is not limited to CD-ROM 209 and may be a flexible disk, a cassette tape, an optical disk (MO (Magnetic Optical Disc)/MD (Mini Disc)/DVD (Digital Versatile Disc)), an IC card, an optical card, or a semiconductor memory such as a mask ROM, EPROM (Erasable Programmable ROM), or EEPROM (Electrically EPROM). CPU 201 may download the application search program from another computer connected to the Internet 5 for storage into HDD 205. Alternatively, another computer may write the application search program into HDD 205, so that the application search program stored in HDD 205 is loaded into RAM 203 and executed by CPU 201. The program referred to herein includes not only a program directly executable by CPU 201 but also a source program, a compressed program, and an encrypted program.

In image search system 1 in the present embodiment, a document image obtained by scanning a document at any of MFPs 100, 100A-100D is registered in the database formed in search server 200. The database formed in search server 200 is searched based on a document image obtained by scanning a document at any of MFPs 100, 100A-100D. As MFPs 100, 100A-100D have the same functions, here, a document image is scanned at MFP 100, and a document image is registered or the database is searched based on a document image at search server 200, by way of example. A plurality of images stored in HDD 205 are referred to as registration images.

Figure 5:
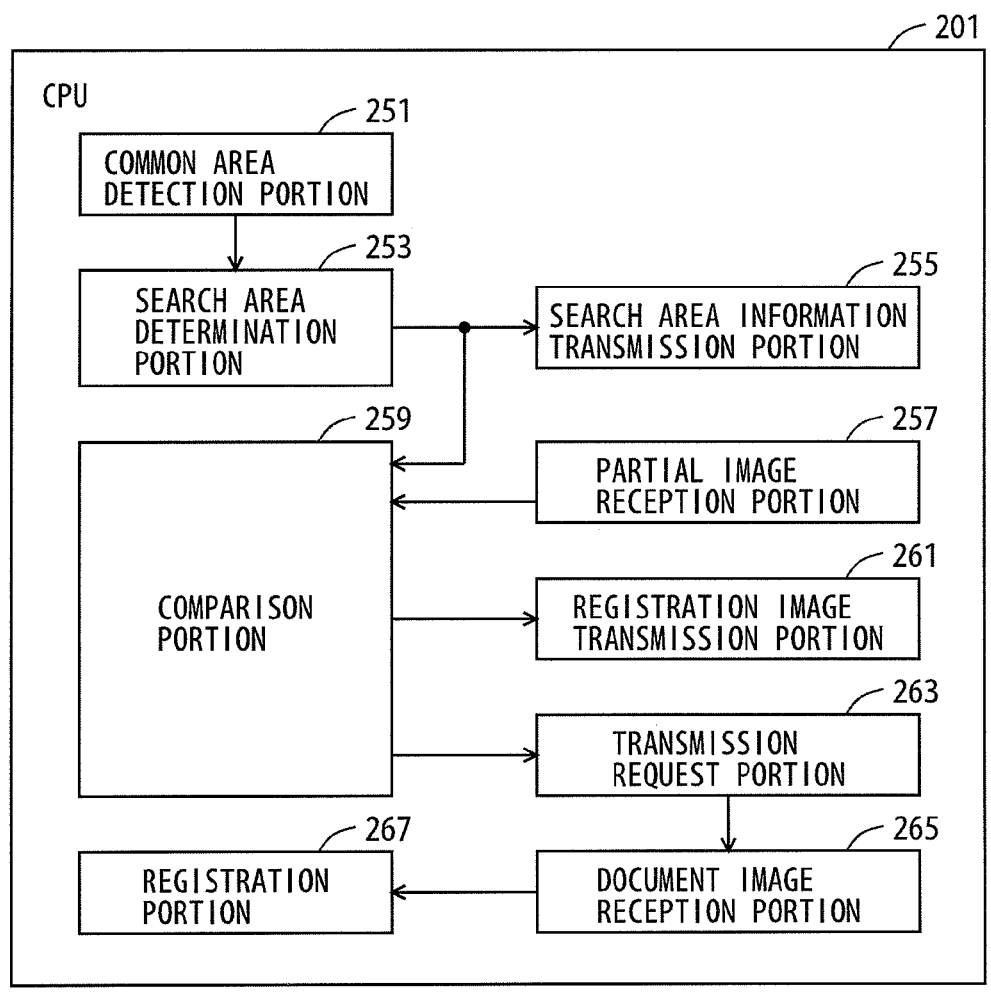
FIG. 5 is a block diagram showing an example of overall functions of a CPU of the search server.

FIG. 5 is a block diagram showing an example of overall functions of the CPU of the search server. The functions shown in FIG. 5 are formed in CPU 201 when CPU 201 of search server 200 executes a database creation program stored in ROM 202, HDD 205, or CD-ROM 209.

Referring to FIG. 5, CPU 201 includes a common area extraction portion 251 extracting a common area including an identical or similar image among a plurality of registration images, a search area determination portion 253 determining a search area, a search area information transmission portion 255 transmitting search area information, a comparison portion 259 comparing a partial image received from MFP 100 with a reference image corresponding to a search area for each of a plurality of images, a registration image transmission portion 261 transmitting a registration image, a transmission request portion 263 requesting transmission of a document image, a document image reception portion 265 receiving a document image, and a registration portion 267 storing a document image into the database.

Common area extraction portion 251 compares a plurality of registration images stored in HDD 205 and extracts a common area including an identical or similar image among the plurality of registration images. A plurality of registration images stored in HDD 205 are classified according to the types of documents, and a plurality of registration images classified according to the types are compared for each document type. Common area extraction portion 251 extracts, as a common area, an area in which a prescribed feature element of the image is identical or similar among a plurality of registration images. Here, the feature element is an image outline included in a registration image. Therefore, common area extraction portion 251 converts each of a plurality of registration images into an edge image and compares a plurality of edge images with each other, thereby extracting, as a common area, a rectangular area including the identical or similar line drawing among a plurality of edge images. The edge image is a differential image obtained by converting each of a plurality of pixels included in a registration image into a difference from the adjacent pixel. If common area extraction portion 251 cannot extract a common area that is common among all the plurality of registration images classified in the same type, an area including an identical or similar image among a prescribed ratio of number of registration images in a plurality of registration images classified in the same type may be assumed as a common area. A prescribed ratio may be predetermined.

Common area extraction portion 251 outputs the location of the extracted common area in the registration image to search area determination portion 253 and comparison portion 259. As common area extraction portion 251 extracts a common area for each document type, common area extraction portion 251 outputs a set of document type and common area to search area determination portion 253.

Search area determination portion 253 receives a set of document type and common area from common area extraction portion 251. Search area determination portion 253 determines a non-common area in an image excluding the common area, as a search area, based on the location of the common area in the registration image that is input from common area extraction portion 251. Search area determination portion 253 outputs a set of document type and search area information indicating the location of the search area in the image to search area information transmission portion 255 and comparison portion 259.

Search area information transmission portion 255 receives a set of document type and search area information from search area determination portion 253. In response to receiving a request for search area information from any of MFPs 100, 100A-100D, here, from MFP 100, search area information transmission portion 255 transmits the search area information through network I/F 204. The request for search area information includes a document type, and search area information transmission portion 255 transmits the search area information that makes a set with the document type included in the request for search area information.

Figure 6:
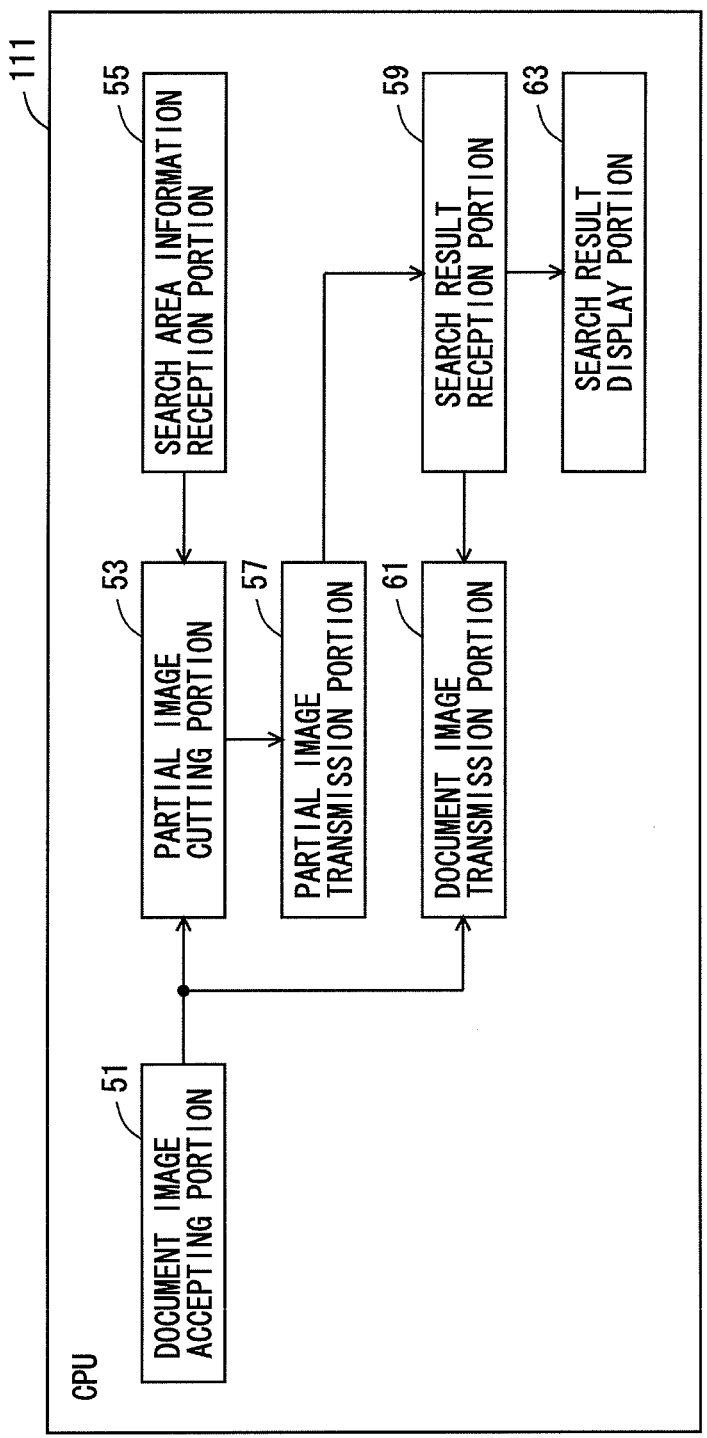
FIG. 6 is a block diagram showing an example of overall functions of a CPU of the MFP.

Here, MFP 100 will be described. FIG. 6 is a block diagram showing an example of overall functions of the CPU of the MFP. The functions shown in FIG. 6 are formed in CPU 111 when CPU 111 of MFP 100 executes a document image registration program stored in ROM 112, HDD 114, or CD-ROM 119. The document image registration program is a part of the database creation program.

Referring to FIG. 6, CPU 111 includes a document image accepting portion 51 accepting a document image, a search area information reception portion 55 receiving search area information from search server 200, a partial image cutting portion 53 cutting out a partial image form a document image, a partial image transmission portion 57 transmitting a partial image to search server 200, a search result reception portion 59 receiving a search result, a document image transmission portion 61 transmitting a document image to search server 200, and a search result display portion 63 displaying a search result.

Document image accepting portion 51 controls document scanning portion 22, allows document scanning portion 22 to scan a document in accordance with a user's operation, and accepts a document image output by document scanning portion 22 scanning the document. A scan instruction is accepted when a user places a document, for example, a magazine on the platen of image scanning portion 22 and presses a start key of operation portion 116. Upon receiving a scan instruction, document image accepting portion 51 allows document scanning portion 22 to scan a document. Document image scanning portion 51 accepts a document image output from document scanning portion 22 and outputs the accepted document image to partial image cutting portion 53 and document image transmission portion 61.

Search area information reception portion 55 displays a type select screen for selecting a document type on display portion 115. When the user inputs an operation to select a document type to operation portion 116, the selected document type is accepted. Search area information reception portion 55 transmits a request for search area information including the accepted document type to search server 200 through network I/F 117. Search server 200, receiving a request for search area information, sends back search area information that makes a set with the document type included in the request for search area information. Search area information reception portion 55 then controls network I/F 117 to receive the search area information from search server 200. Search area information reception portion 55 outputs the received search area information to partial image cutting portion 53.

Partial image cutting portion 53 cuts out a partial image in an area specified by the search area information input from search area information reception portion 55, from the document image input from document image accepting portion 51.

Partial image cutting portion 53 outputs the partial image cut out from the document image to partial image transmission portion 57.

Partial image transmission portion 57 transmits the partial image input from partial image cutting portion 53 to search server 200 through network I/F 117. Partial image transmission portion 57 outputs a signal to search result reception portion 59 to indicate that a partial image has been transmitted to search server 200.

Returning to FIG. 5, partial image reception portion 257 included in CPU 201 obtains a partial image when network I/F 204 receives a partial image from MFP 100. Partial image reception portion 257 outputs the partial image received from network I/F 204 to comparison portion 259.

Comparison portion 259 receives a set of document type and search area information from search area determination portion 253 and receives a partial image from partial image reception portion 257. Comparison portion 259 sets a plurality of registration images classified in the document type input from search area determination portion 253, as process target images, among a plurality of registration images stored in HDD 205. Comparison portion 259 compares the partial image input from partial image reception portion 257 with a plurality of process target images. The target part to be compared in a process target image is a search area part in the process target image that is specified by the search area information input from search area determination portion 253. In a registration image, that part of an image which corresponds to the search area specified by the search area information will be referred to hereinafter as a reference image.

Comparison portion 259 compares a partial image with each of a plurality of reference images. Comparison portion 259 compares a prescribed feature element of a partial image with a prescribed feature element of a reference image. The feature element is an image outline included in an image. Therefore, comparison portion 259 converts a partial image and a reference image each into an edge image and compares the edge image converted from the partial image with the edge image converted from the reference image. Comparison portion 259 determines whether the edge image converted from the partial image and the edge image converted from the reference image are identical or similar. They may be completely identical or may be partially different. Here, "similar" refers to a case where a proportion of the different part to the identical part is equal to or smaller than a prescribed value and includes a case where the shapes are identical or similar and the sizes are different.

If a registration image in which the edge image of the reference image is identical or similar to the edge image of the partial image exists in a plurality of registration images, comparison portion 259 outputs that registration image to registration image transmission portion 261. If such a registration image does not exist, comparison portion 259 sends a transmission request instruction to transmission request portion 263.

If a registration image is input from comparison portion 259, registration image transmission portion 261 transmits the registration image to MFP 100 that has transmitted the partial image through network I/F 117.

If a transmission request instruction is input from comparison portion 259, transmission request portion 263 transmits a transmission request to request transmission of a document image to MFP 100 that has transmitted the partial image through network I/F 117. Transmission request portion 263 outputs a signal to document image reception portion 265 to indicate that a transmission request has been transmitted to MFP 100.

After the signal indicating that a transmission request has been transmitted to MFP 100 is input from transmission request portion 263, document image reception portion 265 controls network I/F 204 to receive a document image transmitted by MFP 100. Document image reception portion 265 outputs the received document image to registration portion 267.

Registration portion 267 stores the document image input from document image reception portion 265 into HDD 205. At this time, the document image is classified according to the document type included in the request for search area information received by search area information transmission portion 255 from MFP 100. The registration image is thus stored.

Referring to FIG. 6 again, after the signal indicating that a partial image has been transmitted to search server 200 is input from partial image transmission portion 57, search result reception portion 59 controls network I/F 117 to receive a search result from search server 200. The search result is either a registration image or a transmission request. If receiving a registration image as a search result, search result reception portion 59 outputs the registration image to search result display portion 63. If receiving a transmission request as a search result, search result reception portion 59 outputs the transmission request to document image transmission portion 61 and search result display portion 63.

When a registration image is input from search result reception portion 59, search result display portion 63 displays the registration image on display portion 115. Accordingly, the user is notified that a registration image identical or similar to the document image of the document that the user allows MFP 100 to scan is stored in search server 200. Therefore, the user who has allowed MFP 100 to scan a document for registration in a database realizes that there is no need for newly registering the document image of the document into the database. This avoids a document image of the same document from being redundantly registered and avoids a user from redundantly performing a scan operation for registering a document image. Thus, unnecessary operations by users can be reduced. In addition, the user who has allowed MFP 100 to scan a document in order to search the database can see the search result.

When a transmission request is input form search result reception portion 59, search result display portion 63 displays a message on display portion 115 so as to allow the user to continue a scan operation. The message is, for example, "Scan the next page of the document." For example, when a document is composed of a plurality of pages, the user can repeat the operation of allowing document scanning portion 22 to scan a plurality of pages of the document one by one. Accordingly, the document images of a plurality of pages included in the document are scanned one by one by document scanning portion 22. A plurality of document images are then accepted by document image accepting portion 51 and output one by one from document image accepting portion 51 to document image transmission portion 61.

When a transmission request is input from search result reception portion 59, document image transmission portion 61 transmits a document image input from document image accepting portion 51 to search server 200 through network I/F 117. When a plurality of document images are input one by one from document image transmission portion 61, document image transmission portion 61 combines those document images in one file and transmits the file to search server 200. A plurality of document images input one by one from document image transmission portion 61 may be transmitted to search server 200 in order in which they are input.

FIG. 7 is a flowchart showing an exemplary flow of a database creation process. The database creation process is a process executed by CPU 201 when CPU 201 of search server 200 executes the database creation program stored in ROM 202, HDD 205, or CD-ROM 209.

Referring to FIG. 7, CPU 201 determines whether a request for search area information is received (step S51). If network I/F 204 receives a request for search area information from any of MFPs 100, 100A-100D, it is determined that a request for search area information is received. The process waits until a request for search area information is received (NO in step S51). If a request for search area information is received (YES in step S51), the process proceeds to step S52. Here, a request for search area information is received from MFP 100, by way of example.

In step S52, search area information is transmitted to MFP 100 that has transmitted the request for search area information, through network I/F 204. Then, it is determined whether a partial image is received (step S53). The process waits until network I/F 204 receives a partial image from MFP 100 that has transmitted the request for search area information (NO in step S53). If a partial image is received (YES in step S53), the process proceeds to step S54.

In step S54, a registration image in which the reference image in the part corresponding to the search area is identical or similar to the partial image received in step S53 is extracted from the registration images stored in HDD 205. If a registration image in which the reference image is identical or similar to the partial image is extracted, the process proceeds to step S55. If not extracted, the process proceeds to step S56.

In step S55, the extracted registration image is transmitted to MFP 100 that has transmitted the partial image, through network I/F 204. The process then ends.

On the other hand, in step S56, a transmission request is transmitted to MFP 100 that has transmitted the partial image, through network I/F 204. In the next step S57, the process waits until network I/F 204 receives a document image from MFP 100 to which the transmission request has been sent (NO in step S57). If a document image is received (YES in step S57), the process proceeds to step S58. In step S58, the received document image is stored into HDD 205. The process then ends.

Figure 8:
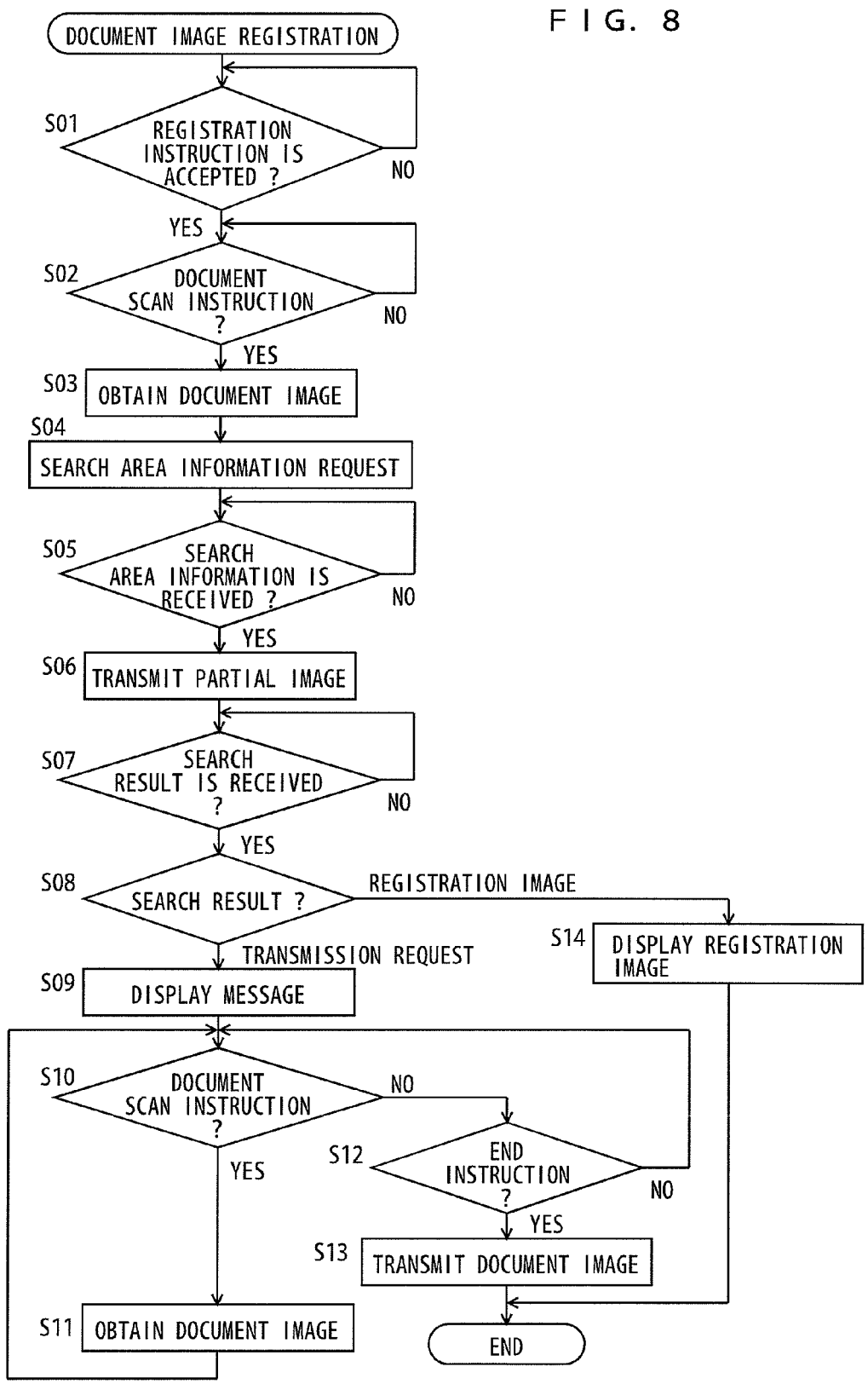
FIG. 8 is a flowchart showing an exemplary flow of a document image registration process.

FIG. 8 is a flowchart showing an exemplary flow of a document image registration process. The document image registration process is a process executed by CPU 111 when CPU 111 of MFP 100 executes a document image registration program stored in ROM 112, HDD 114, or CD-ROM 119.

Referring to FIG. 8, CPU 111 determines whether a registration instruction is accepted (step S01). A registration instruction is accepted if the user presses a key in operation portion 116 to which a registration instruction is allocated beforehand. The process waits until a registration instruction is accepted (NO in step S01). If a registration is accepted (YES in step S01), the process proceeds to step S02.

In step S02, it is determined whether a document scan instruction is accepted. A scan instruction is accepted if the user presses a start key in operation portion 116. The process waits until a scan instruction is accepted (NO in step S02). If a scan instruction is accepted (YES in step S02), the process proceeds to step S03. In step S03, document scanning portion 22 scans a document, and a document image output by document scanning portion 22 is obtained.

In the next step S04, a request for search area information is transmitted to search server 200. Search server 200 receiving a request for search area information sends back search area information, and it is determined whether search area information is received in the next step S05.

The process waits until search area information is received (NO in step S05). If search area information is received (YES in step S05), the process proceeds to step S06.

In step S06, a partial image is transmitted to search server 200. A search area specified by the search area information received in step S05 is cut out from the document image obtained in step S03. The cut partial image is then transmitted to search server 200 through network I/F 117.

In the next step S07, it is determined whether a search result is received from search server 200. The process waits until a search result is received (NO in step S07). If a search result is received (YES in step S07), the process proceeds to step S08. In step S08, the process branches depending on the received search result. If a transmission request is received as a search result, the process proceeds to step S09. If a registration image is received as a search result, the process proceeds to step S14.

In step S09, a message is displayed on display portion 115. The message is, for example, "Scan the next page of the document." For example, when a document is composed of a plurality of pages, the user repeats the operation of allowing document scanning portion 22 to scan a plurality of pages of the document one by one.

In the next step S10, it is determined whether a document scan instruction is accepted. A scan instruction is accepted if the user presses a start key in operation portion 116. If a scan instruction is accepted (YES in step S10), the process proceeds to step S11. If not, the process proceeds to step S12. In step S12, it is determined whether an end instruction is accepted. An end instruction is accepted if the user presses a stop key in operation portion 116. If an end instruction is accepted (YES in step S12), the process proceeds to step S13. If not, the process returns to step S10.

In step S11, document scanning portion 22 scans a document, and a document image output by document scanning portion 22 is obtained. The process then returns to step S10. When step S11 is repeatedly executed, document images of a plurality of pages included in the document are scanned one by one by document scanning portion 22, and a plurality of document images are thus obtained.

If an end instruction is accepted in step S12 (YES in step S12), in step S13, the document image is transmitted to search server 200 through network I/F 117. The process then ends. The document image at least includes the document image obtained in step S03 and, if step S11 is executed, includes one or more document images obtained in step S11.

On the other hand, in step S14, the received registration image is displayed on display portion 115, and the process then ends. Accordingly, the user is notified that that a registration image identical to the document image of the document that the user allows MFP 100 to scan is stored in search server 200. Therefore, the user realizes that there is no need for newly registering a document image of the document into the database. This avoids a document image of the same document from being redundantly registered and avoids the user from redundantly performing a scan operation for registering a document image. Thus, unnecessary operations by users can be reduced.

As described above, in image search system 1 in the present embodiment, search server 200 compares a plurality of registration images stored in HDD 205, extracts a common area including an identical or similar image among a plurality of registration images, and, in response to a request from MFP 100, transmits search area information indicating the location of a search area in the image excluding the common area to MFP 100. MFP 100 accepts an instruction to register a document image obtained by scanning a document into search server 200, obtains the search area from search server 200, and transmits a partial image cut out from the document image to search server 200 for search. Search server 200 then compares the partial image received from MFP 100 with the reference image corresponding to the search area for each of a plurality of registration images. If a registration image in which the reference image is identical or similar to the partial image does not exist in a plurality of registration images, search server 200 transmits a transmission request to MFP 100 and stores a document image received from MFP 100 into HDD 205.

Therefore, it is determined whether a registration image identical or similar to the document image scanned by MFP 100 exists in HDD 205 of search server 200, using a partial image corresponding to the search area of the document image. Thus, a plurality of document images stored in HDD 205 can be searched efficiently. MFP 100 transmits a partial image corresponding to a search area without transmitting the entire document image for search, thereby reducing the amount of transmitted data. Thus, network resources can be used effectively. When a document image has confidential information, the number of times the confidential information is transmitted can be minimized, because it is not necessary to transmit the entire document image for search.

Although image search system 1 has been described in the foregoing embodiment, it is needless say that the present invention can be understood as a database creation method and a database creation program for causing a computer to execute the process shown in FIG. 7.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image search apparatus capable of communicating with an image scanning apparatus, said image search apparatus comprising:
   a storage portion capable of storing a plurality of registration images;
   a common area extraction portion to compare the plurality of registration images stored in said storage portion, to detect an identical or similar image among the plurality of registration images, and to extract a common area including said image detected among the plurality of registration images;
   a search area determination portion to determine a non-common area among the plurality of registration images excluding said common area, as a search area;
   a search area information transmission portion to transmit search area information indicating a location of said search area in an image to said image scanning apparatus;
   a comparison portion to compare a partial image being an image positioned in the location indicated by said search area information of a document image received from said image scanning apparatus with a reference image being an image positioned in said search area of each of the plurality of registration images stored in said storage portion;
   a transmission request portion to request transmission of the document image if, as a result of comparison by said comparison portion, a registration image in which said reference image is identical or similar to said partial image does not exist in said plurality of registration images; and
   a registration portion to, in response to a request by said transmission request portion, store the document image received from said image scanning apparatus as a registration image into said storage portion.

2. The image search apparatus according to claim 1, wherein said common area extraction portion extracts, as a common area, an area having a prescribed feature element common among the plurality of registration images.

3. The image search apparatus according to claim 1, further comprising a search result transmission portion to, if, as a result of comparison by said comparison portion, a registration image in which said partial image is identical or similar to said reference image exists in said plurality of registration images, transmit the registration image to said image scanning apparatus.

4. An image search system including an image search apparatus and an image scanning apparatus,
   said image search apparatus comprising:
   a storage portion capable of storing a plurality of registration images;
   a common area extraction portion to compare the plurality of registration images stored in said storage portion, to detect an identical or similar image among the plurality of registration images, and to extract a common area including said image detected among the plurality of registration images;
   a search area determination portion to determine a non-common area among the plurality of registration images excluding said common area, as a search area;
   a search area information transmission portion to transmit search area information indicating a location of said search area in an image to said image scanning apparatus;
   a comparison portion to compare a partial image being an image positioned in the location indicated by said search area information of a document image received from said image scanning apparatus with a reference image being an image positioned in said search area of each of the plurality of registration images stored in said storage portion;
   a transmission request portion to request transmission of the document image if, as a result of comparison by said comparison portion, a registration image in which said reference image is identical or similar to said partial image does not exist in said plurality of registration images; and
   a registration portion to, in response to a request by said transmission request portion, store the document image received from said image scanning apparatus as a registration image into said storage portion,
   said image scanning apparatus comprising:
   a document scanning portion to output a document image obtained by scanning a document;
   a partial image transmission portion to transmit a partial image obtained by cutting out a search area part defined by search area information received from said image search apparatus, from said output document image; and
   a document image transmission portion to transmit said document image to said image search apparatus if a transmission request is received from said image search apparatus in response to transmission of said partial image.

5. The image search system according to claim 4, wherein said common area extraction portion extracts, as a common area, an area having a prescribed feature element common among the plurality of registration images.

6. The image search system according to claim 4, further comprising a search result transmission portion to, if, as a result of comparison by said comparison portion, a registration image in which said partial image is identical or similar to said reference image exists in said plurality of registration images, transmit the registration image to said image scanning apparatus.

7. A database creation method executed in an image search apparatus capable of communicating with an image scanning apparatus, said image search apparatus including a storage portion capable of storing a plurality of registration images, said database creation method comprising the steps of:

comparing the plurality of registration images stored in said storage portion, detecting an identical or similar image among the plurality of registration images, and extracting a common area including said image detected among the plurality of registration images;

determining a non-common area among the plurality of registration images excluding said common area, as a search area;

transmitting search area information indicating a location of said search area in an image to said image scanning apparatus in response to a request from said image scanning apparatus;

comparing a partial image being an image positioned in the location indicated by said search area information of a document image received from said image scanning apparatus with a reference image being an image positioned in said search area of each of the plurality of registration images stored in said storage portion;

requesting transmission of the document image from said image scanning apparatus if as a result of comparison in said step of comparing, a registration image in which said reference image is identical or similar to said partial image does not exist in said plurality of registration images; and storing the document image received from said image scanning apparatus as a registration image into said storage portion in response to a request in said step of requesting transmission.

8. The database creation method according to claim 7, wherein said step of extracting a common area includes the step of extracting, as a common area, an area having a prescribed feature element common among the plurality of registration images.

9. The database creation method according to claim 7, further comprising the step of, if, as a result of comparison in said step of comparing, a registration image in which said partial image is identical or similar to said reference image exists in said plurality of registration images, transmitting the registration image to said image scanning apparatus.

10. A non-transitory computer-readable recording medium encoded with a database creation program performed by a computer, said computer being configured to control an image search apparatus capable of communicating with an image scanning apparatus, said image search apparatus including a storage portion capable of storing a plurality of registration images, said program causing said computer to execute processing comprising the steps of:

comparing the plurality of registration images stored in said storage portion, detecting an identical or similar image among the plurality of registration images, and extracting a common area including said image detected among the plurality of registration images;

determining a non-common area among the plurality of registration images excluding said common area, as a search area;

transmitting search area information indicating a location of said search area in an image to said image scanning apparatus in response to a request from said image scanning apparatus;

comparing a partial image being an image positioned in the location indicated by said search area information of a document image received from said image scanning apparatus with a reference image being an image positioned in said search area of each of the plurality of registration images stored in said storage portion;

requesting transmission of the document image from said image scanning apparatus if, as a result of comparison in said step of comparing, a registration image in which said reference image is identical or similar to said partial image does not exist in said plurality of registration images; and storing the document image received from said image scanning apparatus as a registration image into said storage portion in response to a request in said step of requesting transmission.

11. The non-transitory computer-readable recording medium encoded with a database creation program according to claim 10, wherein said step of extracting a common area includes the step of extracting, as a common area, an area having a prescribed feature element common among the plurality of registration images.

12. The non-transitory computer-readable recording medium encoded with a database creation program according to claim 10, said program further comprising the step of, if, as a result of comparison in said step of comparing, a registration image in which said partial image is identical or similar to said reference image exists in said plurality of registration images, transmitting the registration image to said image scanning apparatus.

* * * * *